June 22, 1954
R. B. BOURNE
2,681,516
ROTARY SNOWPLOW
Filed March 1, 1949
2 Sheets-Sheet 1
Fig. 1
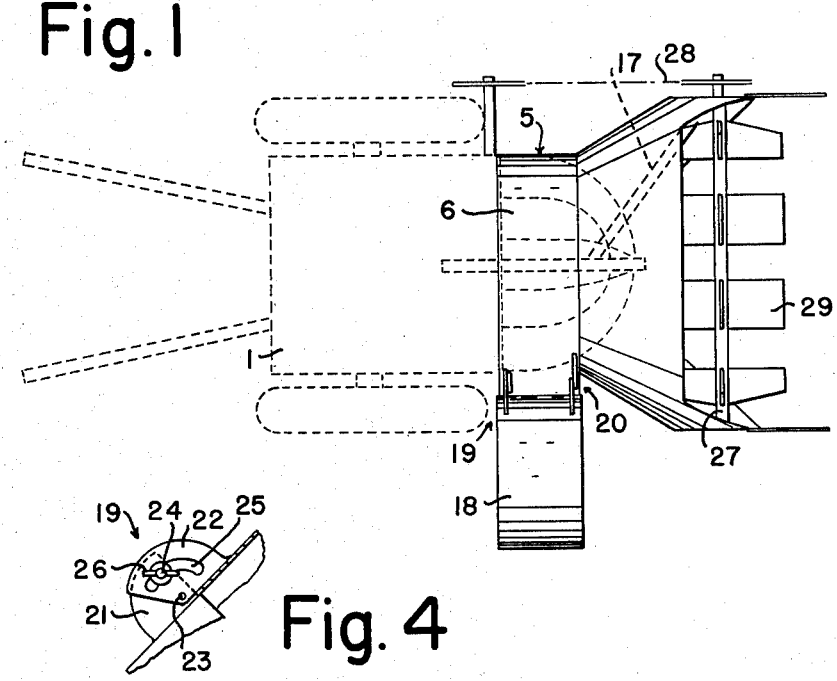
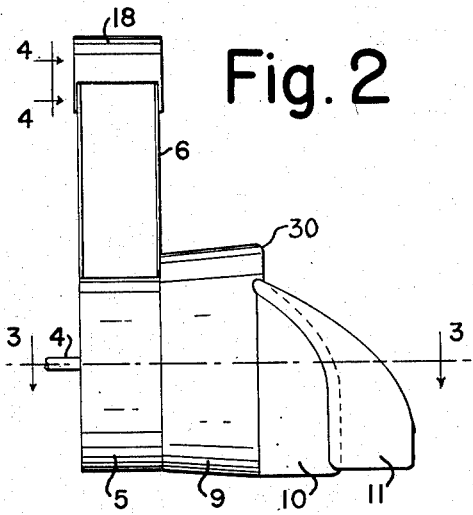
Fig. 4
Fig. 2
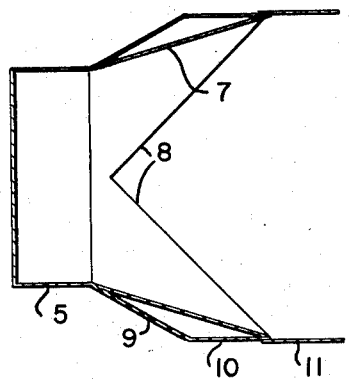
Fig. 3
Roland B. Bourne
INVENTOR
BY *Edward C. Taylor*
ATTORNEY June 22, 1954
R. B. BOURNE
2,681,516
ROTARY SNOWPLOW
Filed March 1, 1949
2 Sheets-Sheet 2
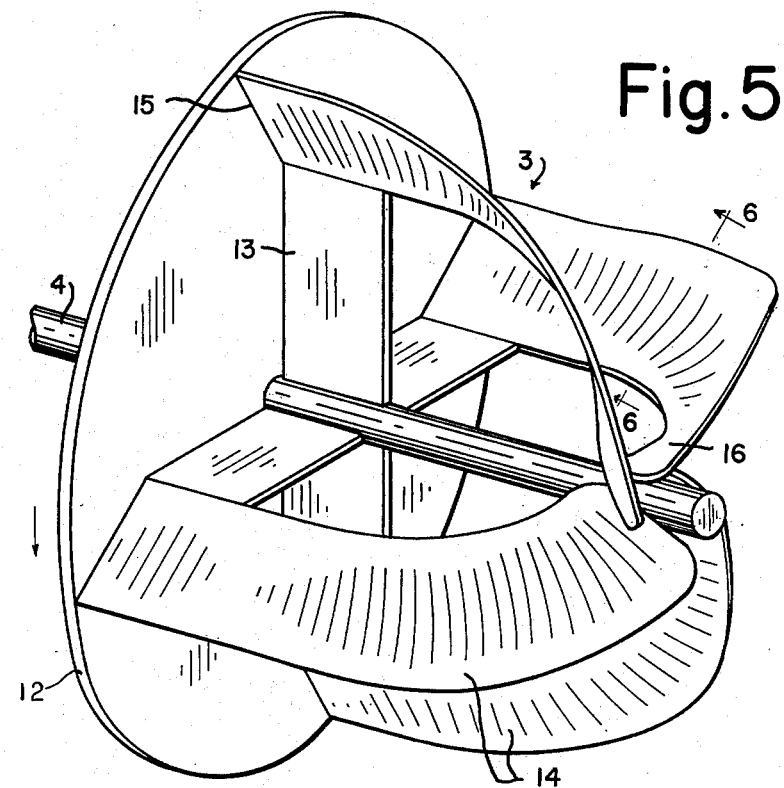
Fig. 5
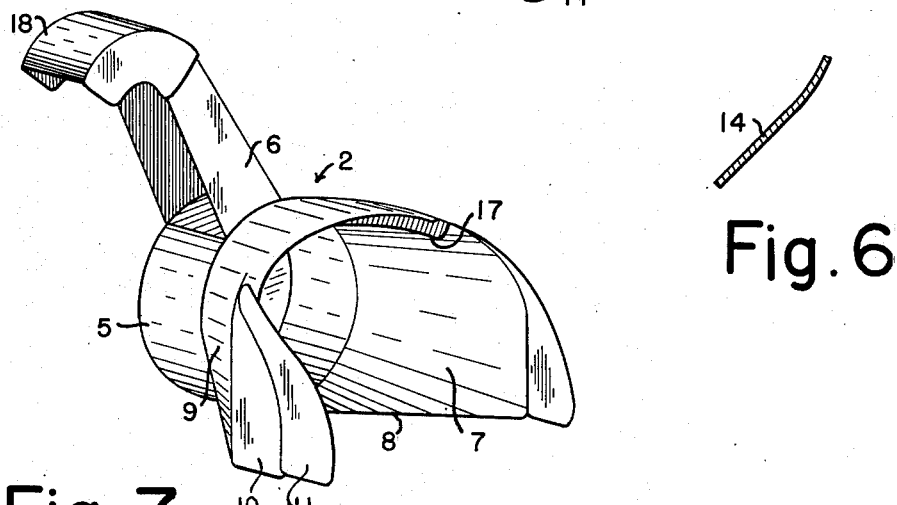
Fig. 6
Fig. 7
Roland B. Bourne
INVENTOR
BY Edward C. Taylor
ATTORNEY Patented June 22, 1954

2,681,516

UNITED STATES PATENT OFFICE 2,681,516

ROTARY SNOWPLOW

Roland B. Bourne, West Hartford, Conn., assignor to The Maxim Silencer Company, Hartford, Conn., a corporation of Connecticut Application March 1, 1949, Serial No. 78,900

4 Claims. (Cl. 37—43)

This invention relates to snow plows of the rotary type which throw rather than push the snow as in plows of the moldboard type. In particular the invention relates to rotary plows which may be powered by a vehicle of the garden tractor type so as to be usable for driveways and sidewalks.

The main problem with rotary plows of this type is to insure the feeding of the snow to the rotor under all weather conditions. Dry, powdery snow will feed in with no difficulty, but moist or wet snow will tend to pack before reaching the rotor. One object of the present invention is to provide a rotor which will act as its own feeder. Another object is to provide a novel hood for the rotor which will facilitate the feeding of the snow to the rotor blades and will prevent the snow from packing except under unusual conditions. Another object is to provide a novel hood arrangement which will prevent snow once engaged by the rotor from being repassed forwardly out of the hood. Additional advantages and objects will appear from the following description and claims.

The improved plow will now be described with reference to the accompanying drawings, in which:

Fig. 1 is a top plan of the plow showing the parts concealed within the housing and the outline of the tractor portion in dotted lines;

Fig. 2 is a side elevation of the housing enclosing the snow throwing elements of the plow;

Fig. 3 is a section on line 3—3 of Fig. 2 with the rotor removed;

Fig. 4 is a detail on an enlarged scale, taken on lines 4—4 of Fig. 2;

Fig. 5 is a perspective view of the rotor on an enlarged scale;

Fig. 6 is a section on line 6—6 of Fig. 5; and

Fig. 7 is a perspective view of the hood with the rotor removed.

The plow is adapted to be secured to the front of a garden tractor type of vehicle 1 which serves both as a means for moving the plow forwardly and for turning the rotor at a high rate of speed. For a rotor eighteen inches in diameter a six horsepower tractor will be sufficient. The plow is composed of two parts, a hood or housing 2 shown in Fig. 7 and a rotor 3 shown in Fig. 5 and having a shaft 4 extending through the said housing to be supported and rotated by the power plant of the tractor. Since the mounting of the shaft will depend upon the form of the tractor, which forms no part of the invention, the tractor and shaft mounting have not been shown in detail.

The hood 2 has a cylindrical rotor chamber 5 and preferably double walls for strength and to give the desired configuration. At the top of this rotor chamber is a slanting chute 6 opening at the bottom into the rotor chamber and being open underneath along the whole of its length so that snow will not pack in it. Forwardly of the rotor chamber the inner wall 7 of the hood extends forwardly and laterally to define a snow-receiving chamber in the general shape of a cone the bottom of which is cut away at the plane of the ground to form a V-shaped edge 8. The outer wall portion 9 of the hood slants outwardly and forwardly to bridge across a cutaway portion at the top of the cone. In this way a smooth converging path is prevented to the snow at the sides of the hood while increasing the width of the hood to augment the intake of snow. The cutaway portion at 8 assists in feeding the snow by keeping it in contact with the ground as long as possible as the plow advances, and by eliminating as much as possible of a lower shelf on the hood upon which the snow might pack. Forwardly of the outer wall portion 9 the side walls become parallel at 10, and preferably have parallel side extensions 11 which eliminate side spill when plowing deep snow, cut the snow from the bank and thus assist in feeding, and aid in guiding the plow in a straight line particularly against curbing and walls.

The rotor 3 has a circular disk 12 through which passes the shaft 4 and to which it is secured. All parts, both of the hood and rotor, are preferably secured together by welding, and no fastenings are therefore shown in the drawings. Four radial vanes 13 extend outwardly from the shaft, and merge into longitudinal auger-like vanes 14. The latter are preferably slanted at 15 in the direction of rotation of the rotor (and adjacent the disk may also be regarded as inclined continuations of the vanes 13) and are bent down and inwardly at their forward ends 16 so that they lie diagonally at an angle of about 45° to the shaft and are preferably secured to it. As the rotor turns, the forward ends of blades 14 cut into the snow and draw it back until the slant portions throw it out of the chute 6. Preferably the blades are somewhat dished as shown in Fig. 6, this dishing as well as the forward slant of the blades, causing the snow to be held better and thrown more effectively. It will be readily apparent to those skilled in the art that the forwardly extending portion of the rotor, i. e., that part of the rotor which includes the twisted blades 14, constitutes an auger for breaking up the snow and feeding it to the throwing vanes 13 in the manner described.

This type of rotor has some tendency to throw snow radially outwardly at its forward end, and to prevent this snow so thrown against the interior of the hood from dribbling out, the hood is provided with a plate 17 depending from the top wall of the hood and extending forwardly at an angle to the axis of the rotor, the direction of rotation or hand of the helix thus formed being opposite to the direction of rotation of the latter. Looking from the rear, or handle end, of the snow thrower, the rotor 3 rotates in a clockwise or right-handed direction, while the plate 17 is positioned to form a left-hand helix. If the machine is looked at from the front end, the rotor will of course appear to rotate counter-clockwise or left-handed, while the plate 17 will as before be a left-handed helix. From the first position of the observer the helix will have a hand opposite to that of the rotation of the rotor while from the second position of observation the hand of the helix will be the same as that of the rotor. The top wall of that portion of the hood which defines the snow-receiving chamber is inclined downwardly and forwardly as at 30 (Fig. 2) to direct snow which may be thrown against the inside of the hood downwardly into the path of the advancing housing.

The upper end of chute 6 is preferably provided with an arcuate or scoop-shaped portion 18 open at the bottom and hinged to the chute at 19 and 20. The hinge 19 is preferably constructed as shown in Fig. 4, a plate 21 secured to the chute and a plate 22 on the scoop being pivoted together at 23. A bolt 24 on one of the plates passed through an arcuate slot 25 in the other so that the scoop can be shifted as desired for changing the distance to which the snow is thrown and can be held in adjusted position by a wing nut 26.

The device as described will handle most kinds of snow without difficulty, but some kinds of wet snow may pack into an arch around the forward end of the rotor and fail to be fed rearwardly by the latter unless broken up. Such snow can be positively fed by a device shown in Fig. 1, comprising a cross shaft 27 driven by a chain and sprocket connection from the tractor and carrying a set paddle wheels 29. The end paddles are cut away to clear the conical walls 7 and may be slanted if desired to cause the snow to be fed laterally toward the center of the hood. This additional feeding mechanism is not generally necessary, however, and has been omitted from the other views in the interest of clearness.

What I claim is:

1. A rotary snow plow comprising a housing having a cylindrical rotor chamber, a vaned rotor within the chamber, a snow-receiving chamber extending forwardly and laterally from the rotor chamber and being defined by wall means including a top wall, and a deflecting plate depending from said top wall and extending from the rotor chamber forwardly substantially in the form of a helix having a hand opposite to the direction of rotation of the rotor when viewed from the rear of the plow.

2. A rotary snow plow comprising a housing having a discharge opening, a shaft extending forwardly within the said housing in the direction of travel of the plow, throwing vanes secured to said shaft and extending radially thereof within the said housing so as to force snow into said discharge opening, wall means on said housing including a top wall extending forwardly of said throwing vanes to define a snow-receiving chamber around the forwardly extending portion of said shaft, auger vanes formed as continuations of the radially outer portions of said throwing vanes and extending forwardly and radially inwardly toward the forwardly extending portion of said shaft and being secured thereto in diagonal relationship therewith to provide a forwardly projecting auger which will break up snow and feed it to the throwing vanes as the plow is advanced, said top wall of the housing being inclined downwardly at its forward edge to assist in directing snow into the auger, and a deflecting plate depending from said top wall and extending forwardly and substantially in the form of a helix having a hand opposite to the direction of the rotor when viewed from the rear of the plow.

3. A rotary snow plow comprising a housing having a discharge opening, a shaft extending forwardly within the said housing in the direction of travel of the plow, throwing vanes secured to said shaft and extending radially thereof within the said housing so as to force snow into said discharge opening, wall means on said housing including a top wall extending forwardly of said throwing vanes to define a snow-receiving chamber around the forwardly extending portion of said shaft, auger vanes formed as continuations of the radially outer portions of said throwing vanes and extending forwardly and radially inwardly toward the forwardly extending portion of said shaft and being secured thereto in diagonal relationship therewith to provide a forwardly projecting auger which will break up snow and feed it to the throwing vanes as the plow is advanced, and a deflecting plate depending from said top wall and extending forwardly substantially in the form of a helix having a hand opposite to the direction of the rotor when viewed from the rear of the plow and being adapted to assist in directing snow into the auger.

4. A rotary snow plow comprising a housing having a rotor chamber, a vaned rotor within the chamber, a snow-receiving chamber extending forwardly and laterally from the rotor chamber and being defined by side walls and a top wall, and a deflecting plate depending from said top wall and extending laterally inwardly from one of said side walls.

References Cited in the file of this patent
UNITED STATES PATENTS

| Number | Name | Date |
|---|---|---|
| 366,767 | Eberhart | July 19, 1887 |
| 1,401,583 | Christoph | Dec. 27, 1921 |
| 1,413,007 | Curtis | Apr. 18, 1922 |
| 1,566,464 | Caterson | Dec. 22, 1925 |
| 1,641,723 | Zinn | Sept. 6, 1927 |
| 1,698,901 | Zinn | Jan. 15, 1929 |
| 1,848,554 | Smith et al. | Mar. 8, 1932 |
| 2,024,551 | Thornhill | Dec. 17, 1935 |
| 2,223,372 | Klauer | Dec. 3, 1940 |
| 2,315,007 | Morse et al. | Mar. 30, 1943 |
| 2,375,965 | Turtle | May 15, 1945 |
| 2,390,421 | Caldwell | Dec. 4, 1945 |